United States Patent [19]

Mosher

[11] Patent Number: 5,413,361
[45] Date of Patent: May 9, 1995

[54] SKI-RAIL FOR A WAGON

[76] Inventor: Max B. Mosher, 480 W. Charlotte St., Centreville, Mich. 49032

[21] Appl. No.: 218,246

[22] Filed: Mar. 28, 1994

[51] Int. Cl.⁶ .................................................. B62B 9/04
[52] U.S. Cl. ........................................ 280/7.12; 280/8; 280/13
[58] Field of Search .................. 280/7.1, 7.12, 7.13, 280/7.14, 8, 9, 845, 13, 28

[56] References Cited

U.S. PATENT DOCUMENTS

| | | | |
|---|---|---|---|
| 185,014 | 12/1876 | Brooks | 280/8 |
| 1,380,860 | 6/1921 | Bartuzel | 280/13 |
| 2,414,244 | 1/1947 | Roth | 280/13 |
| 2,523,950 | 9/1950 | Golubics | 280/13 |
| 2,577,459 | 12/1951 | Gellenbeck | 280/8 |
| 4,194,753 | 3/1980 | Schrishuhn, Jr. | 280/7.13 X |

Primary Examiner—Margaret A. Focarino
Assistant Examiner—Michael Mar
Attorney, Agent, or Firm—Michael I. Kroll

[57] ABSTRACT

A ski-rail is provided for a wagon having a side rail with a lip and four wheels, which consists of an assembly for forming a segmented railing, which is assembled onto and about the lip on the side rail of the wagon, to help keep a child in the wagon when used during the summer months. A unit for forming four runners form the disassembled segmented railing assembly is then assembled onto the four wheels, so as to convert the wagon into a sled, to allow it to be used on ice and snow during the winter months.

10 Claims, 2 Drawing Sheets

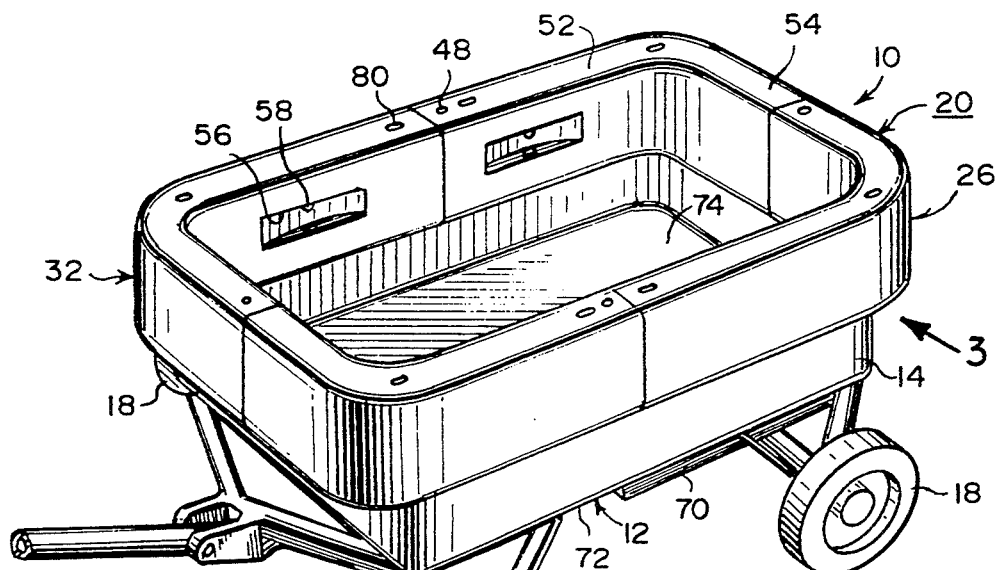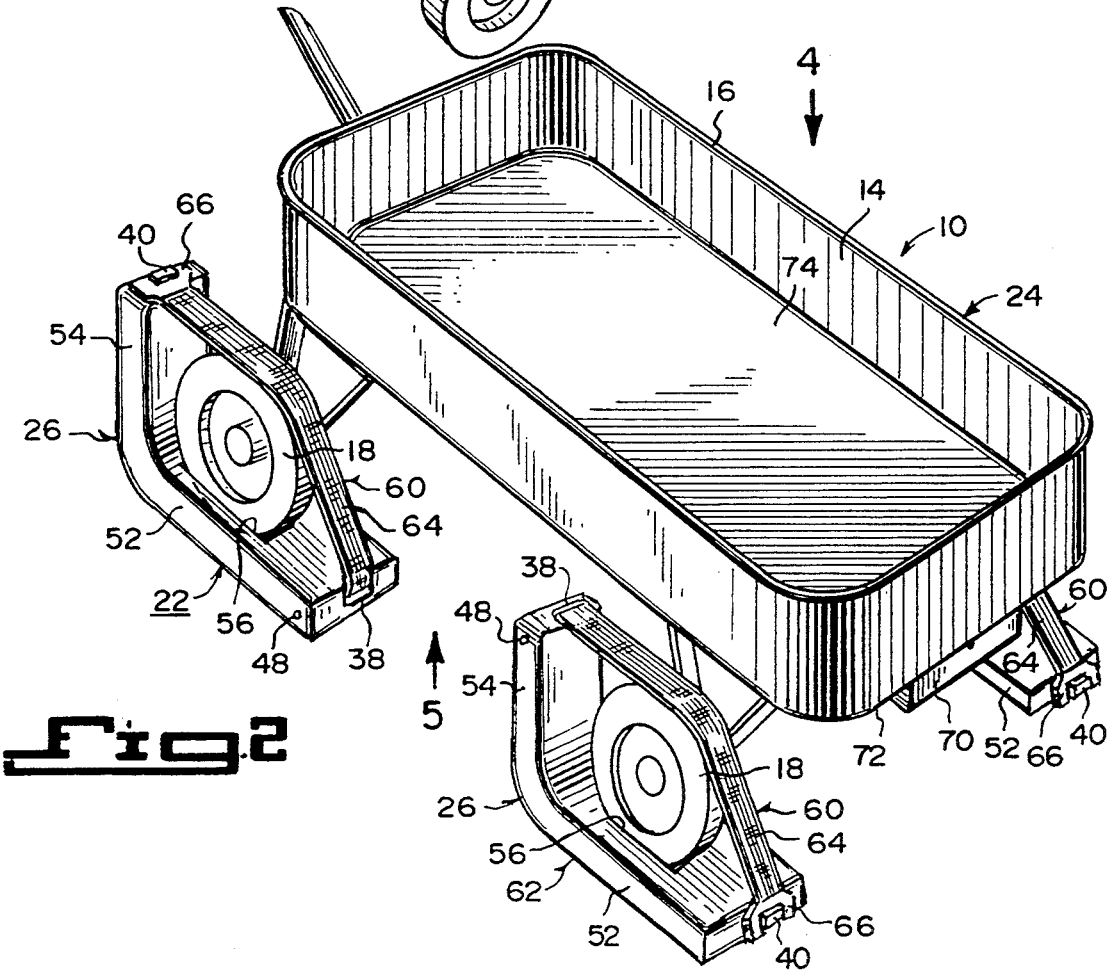

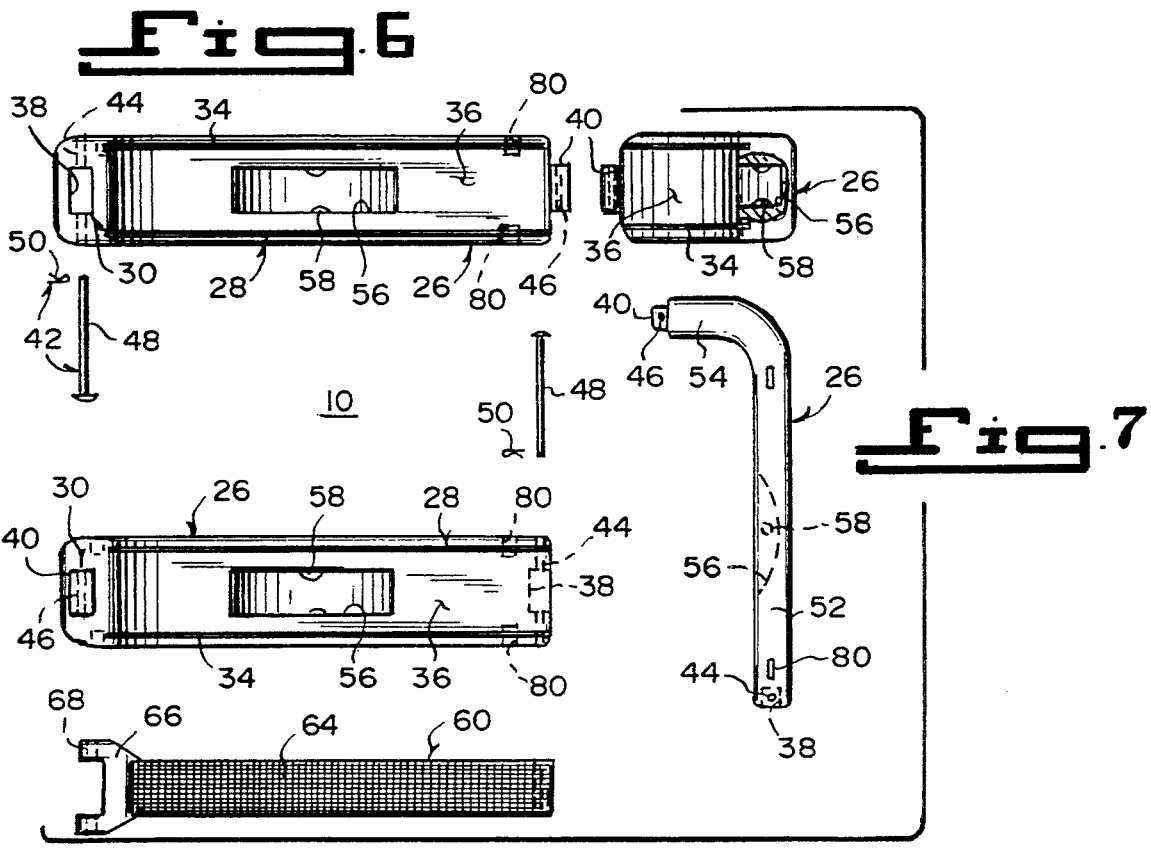

SKI-RAIL FOR A WAGON

BACKGROUND OF THE INVENTION

1. Field of the Invention

The instant invention relates generally to wagons and more specifically it relates to a ski-rail for a wagon.

2. Description of the Prior Art

Numerous wagons and sleds have been provided in prior art, in which the wagons are children's low, four-wheeled carts hauled by long handles that governs the direction of the front wheels. The sleds are vehicle mounted on runners, used for carrying people or loads over ice and snow. While these units may be suitable for the particular purpose to which they address, they would not be as suitable for the purposes of the present invention as heretofore described.

SUMMARY OF THE INVENTION

A primary object of the present invention is to provide a ski-rail for a wagon that will overcome the shortcomings of the prior art devices.

Another object is to provide a ski-rail for a wagon that includes a segmented railing that is assembled onto a lip of a side rail of the wagon, to help keep a child in the wagon when used during the summer months.

An additional object is to provide a ski-rail for a wagon, in which the segmented railing can be disassembled and attached onto each wheel of the wagon to form runners, so as to convert the wagon into a sled, allowing it to be used on ice and snow during the winter months.

A further object is to provide a ski-rail for a wagon that is simple and easy to use.

A still further object is to provide a ski-rail for a wagon that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a wagon with the instant invention installed on the lip of a side rail as a railing, to help keep a child therein.

FIG 2 is a perspective view of the wagon with the instant invention installed on each wheel of the wagon, so as to convert the wagon into a sled.

FIG. 3 is a side view taken in the direction of arrow 3 in FIG. 1.

FIG. 4 is a top view taken in the direction of arrow 4 in FIG. 2.

FIG. 5 is a bottom view taken in the direction of arrow 5 in FIG. 2.

FIG. 6 is a side view similar to FIG. 3, with a canopy installed onto the railing.

FIG. 7 is a view showing some of the various components of the instant invention disassembled from the wagon.

DETAILED DESCRIPTION OF THE PREFERRED EMBODIMENTS

Turning now descriptively to the drawings, in which similar reference characters denote similar elements throughout the several views, FIGS. 1 through 7 illustrate a ski-rail 10 for a wagon 12, having a side rail 14 with a lip 16 and four wheels 18, which consists of an assembly 20 for forming a segmented railing, which is assembled onto and about the lip 16 on the side rail 14 of the wagon 12, to help keep a child in the wagon when used during the summer months. A unit 22 for forming four runners from the disassembled segmented railing assembly 20 is then assembled onto the four wheels 18, so as to convert the wagon 12 into a sled 24, to allow it to be used on ice and snow during the winter months.

The segmented railing assembly 20 includes four L-shaped bar members 26. Structure 28 are formed in each of the L-shaped bar members 26, for engaging with one quarter corner portion of the lip 16 on the side rail 14 of the wagon 12. Elements 30 are for interlocking the four L-shaped bar members 26 together in a generally rectangular shaped ring configuration 32.

Each lip engaging structure 28 includes each L-shaped bar member 26 having a pair of parallel elongated longitudinal grooves 34 running along an inner surface 36 adjacent opposite edges thereof. Either of the grooves 34 can engage with the one quarter corner portion of the lip 16 on the side rail 14 of the wagon 12.

The interlocking elements 30 consist of the L-shaped bar members 26 having a socket 38 at one end and a mating plug 40 at an opposite end. One plug 40 from one L-shaped bar member 26 can mate with one socket 38 from another L-shaped bar member 26. The interlocking elements 30 further contains fasteners 42, for retaining each mating plug 40 within each socket 38, to prevent an accidental disassembly of the L-shaped bar members 26.

The retaining fasteners 42 include each socket 38 having a transverse aperture 44 extending therethrough. Each plug 40 has a transverse aperture 46 extending therethrough. When each plug 40 is mated with each socket 38, each transverse aperture 46 in each plug 40 will align up with each transverse aperture 44 in each socket 38. A plurality of stud fasteners 48 are provided, with each insertable through the aligned transverse aperture 46, 44 of one mating plug 40 and socket 38. A plurality of cotter pins 50 are also provided, with each for holding each stud fastener 48 in place after insertion.

Each runner unit 22 consists of the L-shaped bar member 26 having a long leg 52 and a short leg 54. The long leg 52 has a curved recess 56 in the inner surface 36 with a plurality of side nipples 58 within the recess 56, to receive and hold a lower portion of one wheel 18 of the wagon 12 therein. A retainer 60 extends between the socket 38 and the plug 40 of the L-shaped bar member 26, then over an upper portion of the wheel 18 thereby forming a ski 62 for the wheel 18.

The retainer 60 contains a flexible strap 64 having a first end to fit into the socket 38 about one stud fastener 48 held by one cotter pin 50. A yoke frame 66 has a transverse aperture 68 therethrough affixed to a second end of the flexible strap 64. The yoke frame 66 can fit over the plug 40 with the transverse aperture 68 of the yoke frame 66 in alignment with the transverse aperture 46 in the plug 40, thereby allowing another stud fastener 48 to be inserted through the aligned transverse apertures 68, 46 of the yoke frame 66 and the plug 40 and held by one cotter pin 50.

A carry box 70 is mounted to a bottom surface 72 of a bed 74 of the wagon 12 at a back end thereof, so as to store the flexible straps 64 with the yoke fames 66, the stud fasteners 48 and the cotter pins 50 therein when not in use.

FIG. 6 shows a canopy 76 to be used during the summer months. Components 78 are for attaching the canopy 76 to the four L-shaped bar members 26 after assembly onto the lip 16 of the side rail 14 of the wagon 12, so as to cover and protect the child within the wagon 12 from the bright rays of the sun.

The canopy attaching components 78 include each long leg 52 of each L-shaped bar member 26 having a pair of spaced apart indentations 80 in each side wall thereof. The canopy 76 has a plurality of vertical pockets 82 therein, to line up with each indentation 80 in each long leg 52 of each L-shaped bar member 26, after assembly on the lip 16 of the side rail 14 of the wagon 12. A plurality of elongated rods 84 are provided, with each to extend through one vertical pocket 82 in the canopy 76 and into one indentation 80 in each long leg 52 in each L-shaped bar member 26.

LIST OF REFERENCE NUMBERS 10 ski-rail
12 wagon
14 side rail of 12
16 lip on 14
18 wheel on 12
20 segmented railing assembly
22 runner unit
24 sled for 12
26 L-shaped bar member
28 lip engaging structures
30 interlocking elements
32 generally rectangular shaped ring configuration
34 elongated longitudinal groove
36 inner surface of 26
38 socket
40 plug
42 retaining fasteners
44 transverse aperture in 38
46 transverse aperture in 40
48 stud fastener
50 cotter pin
52 long leg of 26
54 short leg of 26
56 curved recess in 36 of 52
58 side nipple in 56
60 retainer
62 ski
64 flexible strap
66 yoke frame
68 transverse aperture in 66
70 carry box
72 bottom surface of 74
74 bed of 12
76 canopy
78 canopy attaching components
80 indentation in 52
82 vertical pocket in 76
84 elongated rod It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A ski-rail for a wagon having a rectangular shaped, circumferentially extending side rail with an upper lip portion and four wheels, which comprises:
   a) four L-shaped bar members;
   b) means formed in each of said L-shaped bar members for engaging the lip portion of a respective quarter corner portion of the circumferentially extending side rail;
   c) means for interlocking said four L-shaped bar members together in a generally rectangular shaped ring configuration for forming a segmented railing which, when assembled onto and about the lip portion of the side rail of the wagon, raises the effective height of the side rail; and
   d) means for releasably securing each of said L-shaped bar members to a respective one of said wheels for forming four runners, when said segmented railing has been disassembled into said four L-shaped bar members, so as to convert the wagon into a sled to be used on ice and snow.

2. A ski-rail for a wagon as recited in claim 1, wherein each said lip engaging means includes each said L-shaped bar member having a pair of parallel elongated longitudinal grooves running along an inner surface adjacent opposite edges thereof, so that either of said grooves can engage with the one quarter corner portion of the lip on the side rail of the wagon.

3. A ski-rail for a wagon as recited in claim 2, wherein said interlocking means includes each of said L-shaped bar members having a socket at one end and a mating plug at an opposite end, so that one said plug from one said L-shaped bar member can mate with one said socket from another said L-shaped bar member.

4. A ski-rail for a wagon as recited in claim 3, wherein said interlocking means further includes means for retaining each said mating plug within each said socket to prevent an accidental disassembly of said L-shaped bar members.

5. A ski-rail for a wagon as recited in claim 4, wherein said retaining means includes:
   a) each said socket having a transverse aperture extending therethrough;
   b) each said plug having a transverse aperture extending therethrough, so that when each said plug is mated with each said socket, each said transverse aperture in each said plug will align up with each said transverse aperture in each said socket;
   c) a plurality of stud fasteners, each insertable through said aligned transverse apertures of one said mating plug and socket; and d) a plurality of cotter pins, each for holding each said stud fastener in place after insertion.

6. A ski-rail for a wagon as recited in claim 5, wherein each said runner means includes:
   a) said L-shaped bar member having a long leg and a short leg;
   b) said long leg having a curved recess in the inner surface with a plurality of side nipples within said recess to receive and hold a lower portion of one wheel of the wagon therein;
   c) a retainer extending between said socket and said plug of said L-shaped bar member then over an upper portion of the wheel, thereby forming a ski for the wheel.

7. A ski-rail for a wagon as recited in claim 6, wherein said retainer includes:
   a) a flexible strap having a first end to fit into said socket about one said stud fastener held by one said cotter pin; and
   b) a yoke frame having a transverse aperture therethrough affixed to a second end of said flexible strap, so that said yoke frame can fit over said plug with said transverse aperture of said yoke frame in alignment with said transverse aperture in said plug, thereby allowing another stud fastener to be inserted through said aligned transverse apertures of said yoke frame and said plug and held by one said cotter pin.

8. A ski-rail for a wagon as recited in claim 7, further including a carry box mounted to a bottom surface of a bed of the wagon at a back end thereof, so as to store said flexible straps with said yoke frames, said stud fasteners and said cotter pins therein when not in use.

9. A ski-rail for a wagon as recited in claim 8, further including:
   a) a canopy to be used during the summer months; and
   b) means for attaching said canopy to said four L-shaped bar members after assembly onto the lip of the side rail of the wagon, so as to cover and protect the child within the wagon from the bright rays of the sun.

10. A ski-rail for a wagon as recited in claim 9, wherein said canopy attaching means includes:
   a) each said long leg of each said L-shaped bar member having a pair of spaced apart indentations in each side wall thereof;
   b) said canopy having a plurality of vertical pockets therein to line up with each said indentation in each said long leg of each said L-shaped bar member after assembly on the lip of the side rail of the wagon; and
   c) a plurality of elongated rods, each to extend through one said vertical pocket in said canopy and into one said indentation in each said long leg in each said L-shaped bar member.

* * * * *